United States Patent
Maier, Jr. et al.

(10) Patent No.: US 6,860,228 B2
(45) Date of Patent: Mar. 1, 2005

(54) MILKING CUP FOR MILKING MACHINES

(76) Inventors: Jakob Maier, Jr., Griesstrasse 4, D-86842 Tuerkheim (DE); Wilfried Hatzack, Griesstrasse 4, D-86842 Tuerkheim (DE)

( * ) Notice: Subject to any disclaimer, the term of this patent is extended or adjusted under 35 U.S.C. 154(b) by 0 days.

(21) Appl. No.: 10/258,705
(22) PCT Filed: Apr. 19, 2001
(86) PCT No.: PCT/EP01/04475
§ 371 (c)(1), (2), (4) Date: Feb. 11, 2003
(87) PCT Pub. No.: WO01/84914
PCT Pub. Date: Nov. 15, 2001

(65) Prior Publication Data
US 2004/0035367 A1 Feb. 26, 2004

(30) Foreign Application Priority Data
Apr. 28, 2000 (DE) .......................... 100 21 080

(51) Int. Cl.⁷ ................................. A01J 5/08
(52) U.S. Cl. ................. 119/14.07; 119/14.36; 119/14.38
(58) Field of Search .................... 119/14.07, 14.36, 119/14.38, 14.44, 14.47, 14.51, 14.53

(56) References Cited
U.S. PATENT DOCUMENTS 4,034,712 A  *  7/1977  Duncan ............... 119/14.36
4,173,946 A  *  11/1979  Maier et al. ........... 119/14.36
4,558,843 A  *  12/1985  Hoefelmayr ............ 251/61
4,936,254 A  *  6/1990  Marshall .............. 119/14.47
5,134,967 A  *  8/1992  Marshall .............. 119/14.47

FOREIGN PATENT DOCUMENTS

| DE | 12 99 165 A | 7/1969 |
| DE | 16 32 935 A | 8/1971 |
| DE | 20 46 276 A | 3/1972 |
| DE | 25 23 465 A | 12/1976 |
| DE | 233 063 A5 | 2/1986 |
| EP | 0 430 526 A | 6/1991 |

* cited by examiner

Primary Examiner—Son T. Nguyen
(74) Attorney, Agent, or Firm—Flynn, Thiel, Boutell & Tanis, P.C.

(57) ABSTRACT

The present invention relates to a milking cup comprising a cup sleeve, a teat rubber inserted in the cup sleeve with a head piece and an intake socket connectable with a milk discharge conduit, and comprising an air inlet valve provided on the milking cup and connected with the interior space of the intake socket via a first conduit, which lets atmospheric air penetrate into the intake socket in response to a relief phase, during which a higher pressure causing a folding-in of the intake socket relative to the milking vacuum pending in the milk discharge conduit is generated in a clearance between the cup sleeve and the intake socket. The invention is characterized in that an opening toward the interior space of the teat rubber is provided in the head piece of the teat rubber, wherein the opening can controllably be supplied with atmospheric air in response to the relief phase.

2 Claims, 2 Drawing Sheets

MILKING CUP FOR MILKING MACHINES

The present invention relates to a milking cup comprising a cup sleeve, a teat rubber inserted in the cup sleeve with a head piece and an intake socket connectable with a milk discharge conduit, and comprising an air inlet valve provided on the milking cup and connected with the interior space of the intake socket via a first conduit, which lets atmospheric air penetrate into the intake socket in response to a relief phase, during which a higher pressure causing a folding-in of the intake socket relative to the milking vacuum pending in the milk discharge conduit is generated in a clearance between the cup sleeve and the intake socket.

Nowadays, almost exclusively automatic milking facilities are used in modern agricultural enterprises, the function of which resides in efficiently milking the milk of high performance cows by simultaneously guaranteeing the as gentle as possible handling of the utter of the animal as to ensure a constantly high milk yield. Moreover, a modern milking facility must be easy to handle and clean. A milking facility which already fulfills said requirements to a great extent is described in DE 25 23 465. Said document discloses a milking cup for an automatic milking facility of the aforementioned type, wherein the end of the first conduit somewhat projects into the intake socket or into a pipe connector disposed between the intake socket and the milk discharge conduit, so that the wetting of the air inlet valve with milk is reduced when the milking cup is turned around.

Another milking cup is described in DE 12 99 165, where a valve element is provided in the head portion of the teat rubber, so that the interior of the head portion of the teat rubber can be supplied with atmospheric air during the relief phase.

Although the milking cup according to the initially mentioned document is a considerable improvement in view of the wetting of the air inlet valve with milk and in view of the milk flow-off to the collector at the beginning of the relief phase, and the milking cup according to the document mentioned last shows advantages in view of the health of the udder of the animal, it is the object to provide an improved milking cup of simple structure, easy to clean and favorable to the well-being of the animal during the milking.

According to the invention said object is provided by disposing an opening toward the interior space of the teat rubber in the head piece of the teat rubber of the above-described milking cup, wherein the opening can controllably be supplied with atmospheric air in response to the relief phase.

The milking cup according to the invention allows the introduction of atmospheric air into the portion of the intake socket underneath the teat during the relief phase, as well as the supply of atmospheric air to the portion of the teat surrounded by the head piece of the teat rubber (said portion of the teat is also called teat base). As the tissue of the teat must be massaged during the relief phase so as to periodically reduce a vascular congestion in the teat caused by the milking vacuum, the milking cup according to the invention makes it possible to intensify the massage effect caused by the folding-in of the teat rubber. This is achieved by reducing the vacuum at the teat base by controllably supplying the same with atmospheric air via the second conduit and the opening provided in the head piece. As a consequence, this teat portion is constricted less and the blood circulation is improved. The reduction of the vacuum at the teat base moreover avoids that the milking cup clings to the teat too tightly, which is unpleasant for the animal. Depending on the reduced volume of the vacuum at the teat base it can be achieved that the milking cup slightly slides down while, when the total milking vacuum is applied, the cup slides up. By said additional massage effect it can be achieved that the teat is pressed empty at the beginning of the relief phase. The construction of the milking cup according to the invention entails that the aforementioned advantages occur simultaneously in combination with an improved discharge of the milk plug formed when the milk flow is intermitted by the folding-in of the rubber teat at the beginning of the relief phase. During the milking process, the milking vacuum transmitted via the milk discharge conduit and serving to intake the milk to be milked at first applies underneath the teat in the suction phase. Furthermore, a vacuum is likewise produced in the clearance between the cup sleeve and the intake socket by means of a pulsator, so that the intake socket of the teat rubber remains in its natural form due to the missing or, respectively, small pressure difference between the interior of the intake socket, i.e. the portion underneath the teat, and the clearance. Due to the vacuum and the gravity the milk drawn off from the teat flows into the milk discharge conduit. When switching to the suction phase the pulsator supplies the clearance, for example, with atmoshpheric pressure, so that, because of the pressure difference, the intake socket is pressed to the teat against its own elasticity and intermits the flow of the milk out of the teat. Furthermore, the portion directly underneath the teat is separated from the portion of the intake socket still being in a flow connection with the milk discharge conduit by the contraction of the elastic intake socket. Due to said contraction or, respectively, collapse of the teat rubber the space underneath the teat is reduced in size, whereby however the milk positioned in the entire milk conduit system cannot follow said pumping effect fast enough by an accelerated flow-off due to the inertia. Thus, a short low pressure drop occurs during the collapse underneath the teat. In the ongoing development of the relief phase an intensified vacuum is produced by the flowing off milk column after the complete collapse of the teat rubber underneath the contraction area. During the subsequent suction phase, i.e. when the teat rubber is reopened, this entails a reverse acceleration of the milk column still in the milk discharge conduit. By the controllable introduction of atmospheric air in response to the relief phase the reverse acceleration of the milk is thereby prevented.

According to the invention said effect is intensified by the opening for the controllable supply with atmospheric air provided on the head piece, as the vacuum reduced at the teat base also causes a slight reduction of the vacuum directly underneath the teat, so that the formation of an additional low pressure underneath the teat during the contraction of the teat rubber is delayed when the teat rubber is folded in already at the beginning of the relief phase. Another advantage resides in that, due to the supply of atmospheric air, defined pressure ratios can be adjusted independently of the teat size at the udder base.

According to a preferred embodiment a second conduit is provided in flow connection with the opening and the air inlet valve for supplying the opening with atmospheric air.

Due to said arrangement the atmospheric air supply of the upper teat portion takes place in the same manner, preferably during the relief phase, in which the air inlet valve likewise supplies the portion underneath the folded in teat rubber with atmospheric air. The function of the milking cup according to the invention is, thus, guaranteed by a single valve, whereby especially the handling and, above all, the cleaning of the milking cup remains unproblematic.

According to another preferred embodiment the first or the second conduit, or both, comprises a device for limiting the flow rate.

Said device, which may for example be an adjusting screw for narrowing the conduit, permits the adjustment of the amount of atmospheric air to be supplied at the teat base so as to obtain a desired operating performance. Thus, for example, the strength of the massage effect can be adjusted.

By the dosed limitation or, respectively, adjustment of the atmospheric air supplied in the relief phase above the milk plug formed upon the folding-in of the teat rubber an optimum milk discharge can additionally be obtained, so that altogether a clear improvement, also on a long-term basis, of the milk yield takes place.

According to yet another preferred embodiment the opening can controllably be supplied with atmospheric air at the beginning of the relief phase in a time delayed manner.

By said step the reduction of the vacuum at the teat base can be performed with a time delay over the folding-in of the teat rubber, which entails the advantageous effect that, due to the adherence of the folding in teat rubber on the teat, the milk in the milk channel is at first still pressed out in a downward direction, and that, in the following, an upwardly directed massage effect for removing the vascular congestion still prevailing in the teat begins due to the now reduced vacuum at the teat base.

According to another embodiment the second conduit is in flow connection with a second air inlet valve.

Thus, the control of the connection of the second conduit by atmospheric pressure can be controlled independently of the first air inlet valve. It is moreover conceivable to perform the controlling independently of the pulsator function.

According to another preferred embodiment the first and the second air inlet valve can be controlled independently of each other.

Said embodiment permits the adjustment of the massage effect as desired, independently of the optimization for transporting the milk away, which is controlled by the first air inlet valve. Said embodiment is especially advantageous if valve elements operable independently of the pulsator are used. Said elements may, for example, be electrically, magnetically, pneumatically or hydraulically driven elements controlled, for example, by an electronic control system.

Figure 1:
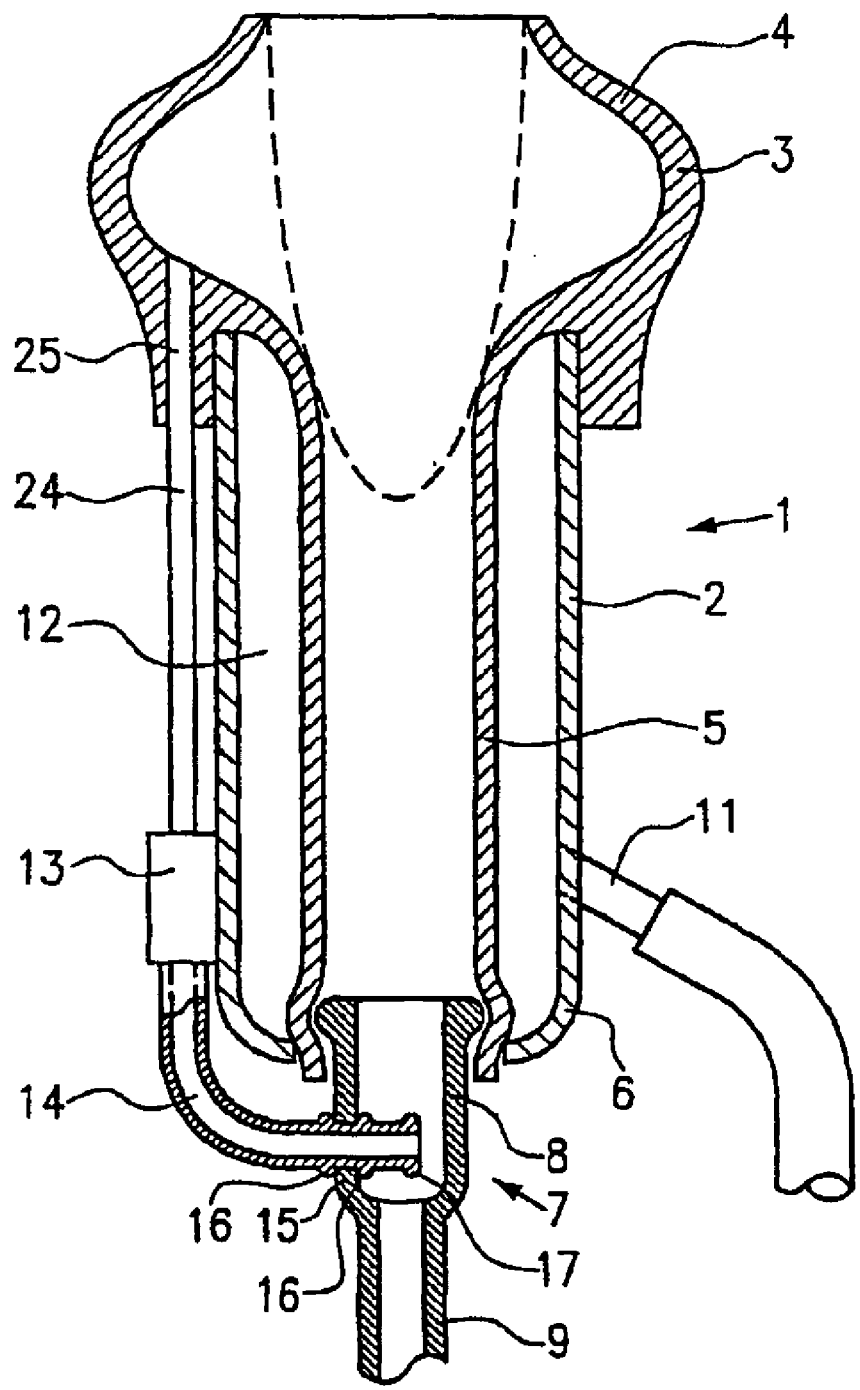
FIG. 1 illustrates a cross section of a milking cup of the invention.

According to the figure, a milking cup 1 comprises a cup sleeve 2 with a teat rubber 3 inserted therein. The teat rubber 3 comprises a head piece 4 by means of which it is retained on the cup sleeve 2, as well as an intake socket 5 preferably made integrally with the head piece 4, projecting into the cup sleeve 2 and protruding out of an opening 6 of the cup sleeve 2. The intake socket 5 is sealed against the inner wall of the cup sleeve 2 by means of an inspection glass 7. The inspection glass 7 is made of first pipe part 8 having a relatively large internal cross-section, whereby said widened pipe part 8 verges into a second pipe part 9 having a reduced cross-section. Said second pipe part 9 of the inspection glass 7 communicates with the milk discharge conduit, which is subject to a continuous vacuum. The milk discharge conduit is not shown in the figure.

A pipe socket 11 is formed on the cup sleeve 2, which connects the annular space 12 positioned between the inner wall of the cup sleeve 2 and the outside of the intake socket 5 with a pulsator not shown in the figure, by means of which the annular space 12 is periodically subjected to a low pressure and, thereafter, again to atmospheric pressure. Likewise connected with the annular space 12 is an air inlet valve 13 affixed to the cup sleeve 2. The air inlet valve 13 is in flow connection with the widened pipe part 8 of the inspection glass 7 via a first conduit 14. Moreover, a second conduit 24 is passed from the air inlet valve 13 to the head piece 4 of the teat rubber 3. The air inlet valve is in flow connection with the interior space of the teat rubber via an opening 25 in the head piece 4 of the teat rubber. The air inlet valve 13 is illustrated only schematically and is configured such that it produces a connection between conduit 14 and the atmosphere in response to the pulsator pressure respectively prevailing in the annular space 12, whereby, in the embodiment, the air inlet valve 13 is adjusted so that it opens during the relief phase when the increase of the pulsator pressure is relatively low, and closes again at the beginning of the suction phase when the pulsator pressure is reduced from the atmospheric pressure to a predetermined low pressure. As the intake socket 5 and the pipe part 8 are permanently subjected to a low pressure via the milk discharge pipe, air under atmospheric pressure can at one opening of the air inlet valve 13, via conduit 14, flow into the pipe part 8 and, thus, into the intake socket 5 and the milk discharge conduit.

First conduit 14 is preferably detachably connected with the widened pipe part 8 of the inspection glass. For this purpose an opening 15 going through the lateral wall is provided in the pipe part 8. For retaining conduit 14 in the opening 15, pipe lamella 16 are formed at the end of conduit 14, which, in the inserted state of the conduit 14, come to rest on opposite sides of the wall of pipe part 8 and firmly retain the conduit 14 in pipe part 8 and also seal it against the pipe part.

The first conduit 14 is preferably formed of a flexible and transparent material, so that it can exactly be observed whether any residues are present therein. Conduit 14 preferably also protrudes by a certain length over the inner wall of pipe part 8 and into the latter. A drip nose 17 may thereby be formed on the end protruding into the pipe part 8. The end protruding into the pipe part 8 and especially the provision of a drip nose at this end prevent milk from flowing back into conduit 14 from the second pipe part 9 and the milk discharge conduit associated therewith when the milking cup is turned around.

The operating mode of the milking cup 1 is approximately as follows:

At the beginning, a teat to be milked is introduced into the intake socket 5 via the head piece 4 of the teat rubber 3. A low pressure is then produced in the intake socket 5, namely via the milk discharge conduit and the inspection glass 7. At the same time, the pulsator is started to operate. If a low pressure is produced in the annular space 12 by the pulsator, the milking cup is in the suction phase, whereby the conduits 14 and 24 are sealed against the atmosphere by the air inlet valve 13. Due to the identical low pressure on the inside and the outside the intake socket 5 thereby has its natural form illustrated in the figure. Due to the vacuum during the suction phase the milk is sucked through the inspection glass 7 into the milk discharge conduit and is discharged through the same.

In the relief phase the annular space 12 is subjected to an atmospheric pressure, whereby the air inlet valve 13 is opened, so that, via conduit 14, atmospheric air can flow into the widened pipe part 8 of inspection glass 7, and, via conduit 24 and the opening 25, atmospheric air can flow into the interior of the teat rubber in the area of the teat base. As seen in the drawing, the opening 25 runs into the interior of the teat rubber, namely in an area above the sealing portion with the teat. During the relief phase the low pressure is, thus reduced over the sealing portion with the teat in response to the amount of admitted atmospheric air. This likewise entails a slightly reduced vacuum underneath the sealing portion, as the sealing between the teat rubber and the teat is not complete. Moreover, during the relief phase and due to atmospheric pressure prevailing in the annular space 12, the intake socket 5 of the teat rubber is folded in against its own elasticity, whereby the upper portion of the intake socket adapts to the teat and a constricted portion is formed underneath the teat, which separates the teat from the portion above the inspection glass 7. Thus, due to the constriction of the teat rubber, the flow of milk from the teat is intermitted and a massage effect occurs as result of the adherence of the teat rubber due to the atmospheric pressure. The milk plug flowing off underneath the constricted portion would, because of its flow-off, produce an even larger vacuum in the portion of the inspection glass 7 and, thus, would be reversely accelerated toward the teat during the subsequent suction phase. This is prevented by the introduction of a certain amount of atmospheric air via the air inlet valve 13 and conduit 14, so that the milk plug can flow off without interruption.

Due to the interaction of the atmospheric air fed in the head piece of the teat rubber and the atmospheric air fed in the inspection glass 7 via conduit 14, a reliable discharge of the milked milk as well as an efficient massage effect for passing back the congested blood in the teat are achieved.

Although, according to the above-described embodiment, the supply with atmospheric air in the upper and lower portion of the intake socket was described on the basis of a single valve, whereby the permanent cleaning of the milking cup is not rendered more difficult in contrast to a conventional milking cup, it is still feasible to control both portions with separate valves. By means of the second conduit 24 and a dosing element provided thereon, which may have the form of a clamp, it is moreover conceivable to constantly supply a certain amount of atmospheric air in the area of the teat base so as to avoid too strong a contraction of the teat in the upper portion. Furthermore, it is advantageous to provide both conduits 14, 24 with separately adjustable dosing elements such as clamps, so as to purposively control the amount of incoming atmospheric air.

Figure 2:
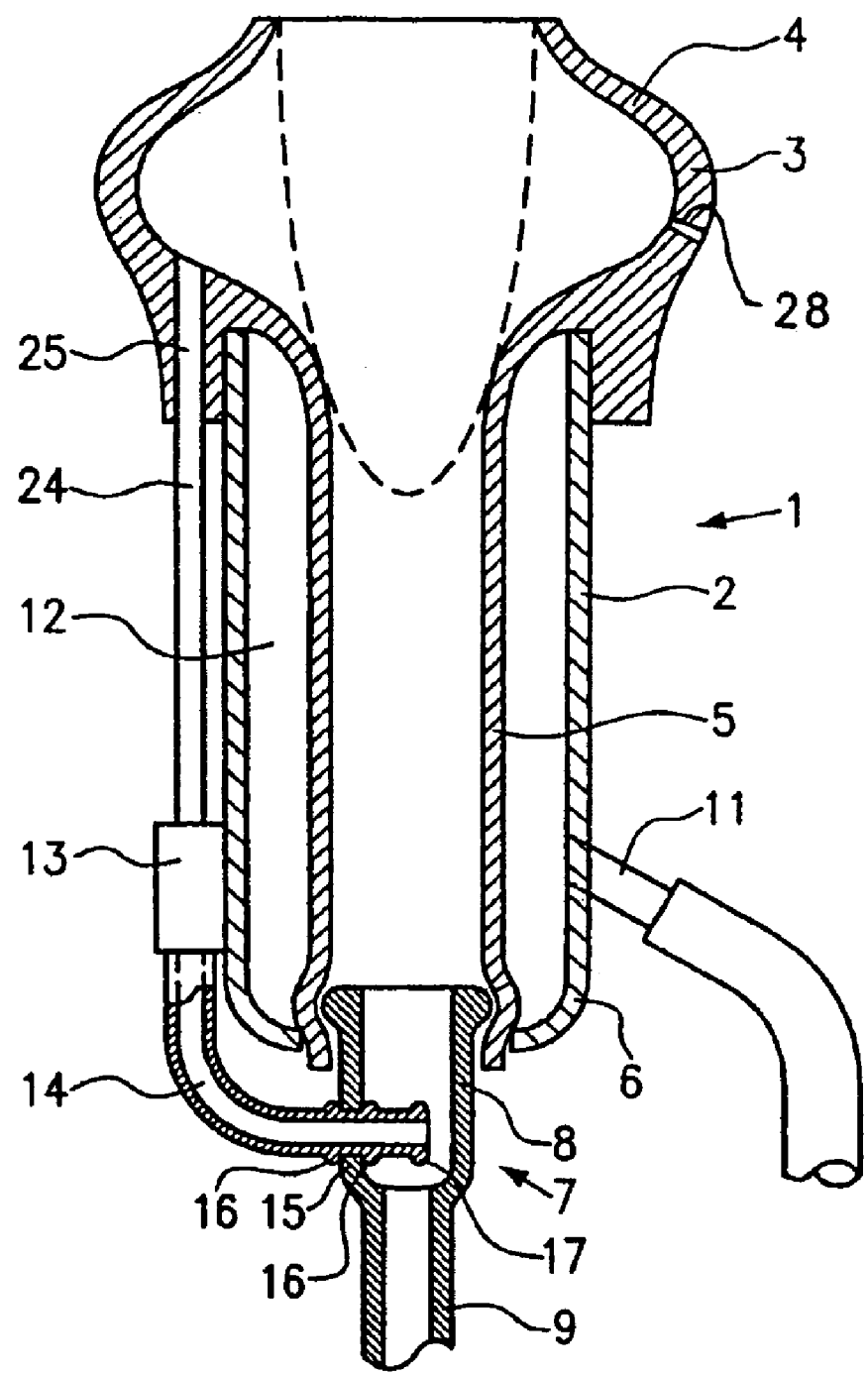
FIG. 2 illustrates a cross section of a milking cup of the invention including a nozzle through the head piece.

According to the embodiment of FIG. 2, an air inlet element, such as nozzle 28, is provided in the head piece 4 for the continuous and controlled inlet of atmospheric air into the interior portion of the head piece. The cross-section of the air inlet element or the nozzle 28 is smaller than the minimum cross-section of the opening 25 in the head piece 4.

According to another embodiment, moreover, a time-lag device is provided in the air inlet valve, which supplies the second conduit 24 with atmospheric air, so as to obtain a certain time delay between the beginning of the relief phase, i.e. the presence of atmospheric pressure in the annular space 12, and the supplying of the upper teat portion with atmospheric air. The time delay can, for instance, be obtained in that the air inlet valve supplying the conduit 24 produces the connection between the atmosphere and conduit 24 only when a relatively high pressure is reached in the annular space 12. Thus, it can be achieved that, by the folding-in of the intake socket, the teat is at first "pressed out" from above and that the blood circulation is stimulated due to the subsequent massage pressure of the intake socket and the reduced adherence of the intake socket by the reduced vacuum in the upper portion of the teat.

An essential advantage of the milking cup according to the invention also resides in that the total weight of the milking cup can be reduced as a result of the improved massage effect. The high weight of a conventional milking cup was particularly required for obtaining a certain stimulation of the udder, namely due to the dynamics during the milking process by the high weight of the swinging milking cup. As the combined supply of atmospheric air causes a corresponding upward and downward movement of the milking cup, the high dead weight of the milking cup can be waived. Therefore, the milking cup can partially or entirely be made of a light material, e.g. a plastic material, for example by means of injection molding.

According to another embodiment the second conduit 24 is formed as an integral component of the teat rubber 3 or, respectively, of the intake socket 5, so that an easy and inexpensive manufacture of the milking cup according to the invention can be achieved.

The air inlet valve is advantageously designed in the manner described in patent document DD 2 33 063, whereby the wetting with milk during the operation is avoided and the cleaning and the maintenance of this cleaned state are improved. Moreover, such an air inlet valve can advantageously be combined with another air inlet valve for supplying the upper teat portion with atmospheric air, as is described in DE 16 32 935.

What is claimed is:

1. A milking cup comprising:
   a cup sleeve;
   a teat rubber comprising a head piece and a hollow intake socket, the intake socket having a proximal end integral with the head piece and a distal end, the intake socket being inserted into the sleeve and forming a clearance between the cup sleeve and the intake socket, said head piece including an interior space for receiving a teat and a separate hole extending through said head piece and opening into the interior space;
   a milk discharge conduit connected to the distal end of said intake socket;
   a first conduit having a first end connected to the distal end of the intake socket;
   an air inlet valve connected to a second end of said first conduit, said air inlet valve being configured to provide atmospheric air through said first conduit into said intake socket at the distal end during a relief phase, the relief phase periodically occurring when an air pressure within the clearance between the cup sleeve and the intake socket is greater than the air pressure of a milking vacuum present within the milk discharge conduit and the intake socket which causes a folding-in of the intake socket; and
   a second conduit connected at one end to said hole of said head piece and at another end to said air inlet valve so as to supply atmospheric air within the interior space of said head piece,
   wherein said air inlet valve provides communication between the first conduit and the second conduit so that a teat portion enclosed in the interior space of the head piece is supplied with a vacuum during a suction phase sufficient to adhere a teat portion to the milking cup.

2. The milking cup according to claim 1, including a nozzle in the head piece.

* * * * *